(12) United States Patent
Goel et al.

(10) Patent No.: US 10,369,409 B2
(45) Date of Patent: *Aug. 6, 2019

(54) DYNAMIC SAMPLING IN SPORTS EQUIPMENT

(71) Applicant: NIKE, Inc., Beaverton, OR (US)

(72) Inventors: Manan Goel, Beaverton, OR (US); Mario Lafortune, Tigard, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/995,959

(22) Filed: Jun. 1, 2018

(65) Prior Publication Data

US 2018/0272186 A1 Sep. 27, 2018

Related U.S. Application Data

(60) Continuation of application No. 15/153,463, filed on May 12, 2016, now Pat. No. 9,999,804, which is a
(Continued)

(51) Int. Cl.
| | |
|---|---|
| *G06K 9/00* | (2006.01) |
| *A63B 24/00* | (2006.01) |
| *A63B 53/00* | (2015.01) |

(52) U.S. Cl.
CPC ........ *A63B 24/0003* (2013.01); *A63B 53/00* (2013.01); *G06K 9/00342* (2013.01)

(58) Field of Classification Search
CPC . A63B 69/36; A63B 24/0003; G06K 9/00342
See application file for complete search history.

(56) References Cited

U.S. PATENT DOCUMENTS 4,146,230 A * 3/1979 Foster .............. A63B 69/3614
473/221
5,472,205 A * 12/1995 Bouton .............. A63B 69/3614
473/222
(Continued)

FOREIGN PATENT DOCUMENTS

JP H0780111 A 3/1995
JP 2008073210 A 4/2008
(Continued)

OTHER PUBLICATIONS

Ghasemzadeh et al. "Sport training using body sensor networks: a statistical approach to measure wrist rotation or golf swing", Proceedings of the 4th International ICST Conference on Body Area Networks, Jan. 1, 2009.*
(Continued)

*Primary Examiner* — Jason Skaarup
(74) *Attorney, Agent, or Firm* — Banner & Witcoff, Ltd.

(57) ABSTRACT

Analysis of sporting equipment characteristics may be analyzed using dynamic sampling rates. For example, analyzing a golf swing may include the use of one or more sensors providing data at various sampling rates. According to some aspects, the sampling rate may be dynamically modified upon determination of one or more golf equipment characteristics, environmental conditions, player characteristics and the like. In one example, a sampling rate processor may dynamically select a sampling rate at which data is sampled from one or more sensors. In some examples, by dynamically selecting the sampling rate, an analysis may be tailored to various types, and portions of a golf swing, in addition to producing power consumption by the analysis instruments in the golf club system. According to other aspects, triggering conditions for modifying a sampling rate may be deter-
(Continued)

mined from a population of one or more previous golf swings performed by a user.

20 Claims, 10 Drawing Sheets

Related U.S. Application Data division of application No. 13/907,776, filed on May 31, 2013, now Pat. No. 9,342,737.

(56) References Cited

U.S. PATENT DOCUMENTS

| | | | | |
|---|---|---|---|---|
| 5,718,639 | A * | 2/1998 | Bouton | A63B 69/3614 473/151 |
| 5,882,269 | A * | 3/1999 | Lewis | A63B 69/3623 434/252 |
| 6,224,493 | B1 * | 5/2001 | Lee | A63B 69/3614 473/221 |
| 6,402,634 | B2 | 6/2002 | Lee et al. | |
| 6,648,769 | B2 | 11/2003 | Lee et al. | |
| 7,457,439 | B1 | 11/2008 | Madsen et al. | |
| 7,587,065 | B2 | 9/2009 | Matsumoto et al. | |
| 7,602,301 | B1 | 10/2009 | Stirling et al. | |
| 7,641,565 | B2 * | 1/2010 | Kiraly | A63B 24/0021 473/151 |
| 7,672,781 | B2 * | 3/2010 | Churchill | G01C 21/165 701/468 |
| 7,689,378 | B2 * | 3/2010 | Kolen | G01C 19/00 702/150 |
| 7,821,407 | B2 | 10/2010 | Shears et al. | |
| 7,825,815 | B2 | 11/2010 | Shears et al. | |
| 7,907,838 | B2 | 3/2011 | Nasiri et al. | |
| 7,978,081 | B2 | 7/2011 | Shears et al. | |
| 8,351,773 | B2 | 1/2013 | Nasiri et al. | |
| 9,999,804 | B2 * | 6/2018 | Goel | G06K 9/00342 |
| 2001/0053720 | A1 * | 12/2001 | Lee | A63B 60/42 473/223 |
| 2002/0064764 | A1 * | 5/2002 | Fishman | A63B 24/0003 434/252 |
| 2003/0040380 | A1 * | 2/2003 | Wright | A63B 57/00 473/409 |
| 2006/0166738 | A1 * | 7/2006 | Eyestone | A63B 15/005 463/36 |
| 2006/0184336 | A1 * | 8/2006 | Kolen | G01C 19/00 702/150 |
| 2006/0287118 | A1 * | 12/2006 | Wright | A63B 24/0003 473/131 |
| 2007/0010341 | A1 * | 1/2007 | Miettinen | A63B 69/3608 473/131 |
| 2007/0298895 | A1 * | 12/2007 | Nusbaum | A63B 69/36 473/131 |
| 2009/0066641 | A1 * | 3/2009 | Mahajan | A63F 13/10 345/156 |
| 2009/0148000 | A1 * | 6/2009 | Madsen | G06T 7/246 382/107 |
| 2009/0208061 | A1 * | 8/2009 | Matsumoto | A63B 24/0003 382/107 |
| 2009/0262074 | A1 * | 10/2009 | Nasiri | A63F 13/06 345/158 |
| 2009/0303204 | A1 * | 12/2009 | Nasiri | A63F 13/06 345/184 |
| 2010/0117837 | A1 * | 5/2010 | Stirling | A61B 5/1127 340/573.1 |
| 2010/0201512 | A1 | 8/2010 | Stirling et al. | |
| 2010/0204616 | A1 | 8/2010 | Shears et al. | |
| 2010/0216565 | A1 * | 8/2010 | Stites | A63B 69/3614 473/231 |
| 2010/0267462 | A1 * | 10/2010 | Mooney | A63B 69/36 473/269 |
| 2010/0299615 | A1 * | 11/2010 | Miluzzo | H04W 4/02 715/752 |
| 2011/0207560 | A1 * | 8/2011 | Wright | A63B 69/3632 473/407 |
| 2011/0230273 | A1 * | 9/2011 | Niegowski | A43B 3/0005 473/199 |
| 2011/0230274 | A1 * | 9/2011 | Lafortune | A43B 3/0005 473/217 |
| 2011/0230985 | A1 * | 9/2011 | Niegowski | A43B 3/0005 700/91 |
| 2011/0230986 | A1 * | 9/2011 | Lafortune | A43B 3/0005 700/93 |
| 2011/0254760 | A1 * | 10/2011 | Lloyd | G01P 15/00 345/156 |
| 2012/0046119 | A1 * | 2/2012 | Davenport | A63B 24/0006 473/223 |
| 2012/0100923 | A1 | 4/2012 | Davenport | |
| 2012/0115626 | A1 * | 5/2012 | Davenport | A63B 24/0006 473/223 |
| 2012/0116548 | A1 * | 5/2012 | Goree | A61B 5/1118 700/90 |
| 2012/0136464 | A1 * | 5/2012 | Saito | A63B 69/3614 700/91 |
| 2012/0143093 | A1 | 6/2012 | Stirling et al. | |
| 2012/0316456 | A1 * | 12/2012 | Rahman | G06F 1/163 600/547 |
| 2013/0002552 | A1 * | 1/2013 | Liang | G06F 1/3259 345/159 |
| 2013/0085007 | A1 | 4/2013 | Davenport | |
| 2013/0090179 | A1 | 4/2013 | Davenport | |
| 2013/0090180 | A1 * | 4/2013 | Nusbaum | A63B 69/36 473/225 |
| 2015/0285834 | A1 * | 10/2015 | Shibuya | G01P 15/0802 702/150 |

FOREIGN PATENT DOCUMENTS

WO 95/35141 A1 12/1995
WO 2005094953 A2 10/2005

OTHER PUBLICATIONS

Eskofier et al. "Development of Pattern Recognition Methods for Golf Swing Motion Analysis", International Symposium of the International Association of computer Science in Sports, Jan. 1, 2011.*

Search Report and Written Opinion of International Application No. PCT/US2014/037433 dated Oct. 21, 2014.

* cited by examiner

DYNAMIC SAMPLING IN SPORTS EQUIPMENT

RELATED APPLICATION INFORMATION

This application is a continuation of U.S. application Ser. No. 15/153,463, filed May 12, 2016, which is a divisional of U.S. application Ser. No. 13/907,776 filed May 31, 2013, issued as U.S. Pat. No. 9,342,737, the entire contents of which are incorporated herein by reference in their entirety for any and all non-limiting purposes.

TECHNICAL FIELD

Aspects of the disclosure relates to sporting equipment. More particularly, aspects described herein include dynamic sampling of sensor data for various types of sporting equipment.

BACKGROUND

Sports such as golf are enjoyed by a wide variety of players—players of different genders and dramatically different ages and/or skill levels. In golf, players at all skill levels seek to improve their performance, lower their golf scores, and reach that next performance "level." Manufacturers of all types of golf equipment have responded to these demands, and in recent years, the industry has witnessed dramatic changes and improvements in golf equipment. For example, a wide range of different golf ball models now are available, with balls designed to complement specific swing speeds and/or other player characteristics or preferences, e.g., with some balls designed to fly farther and/or straighter; some designed to provide higher or flatter trajectories; some designed to provide more spin, control, and/or feel (particularly around the greens); some designed for faster or slower swing speeds; etc. A host of swing and/or teaching aids also are available on the market that promise to help lower one's golf scores.

Being the sole instrument that sets a golf ball in motion during play, golf clubs also have been the subject of much technological research and advancement in recent years. For example, the market has seen dramatic changes and improvements in putter designs, golf club head designs, shafts, and grips in recent years. Additionally, other technological advancements have been made in an effort to better match the various elements and/or characteristics of the golf club and characteristics of a golf ball to a particular user's swing features or characteristics (e.g., club fitting technology, ball launch angle measurement technology, ball spin rates, etc.).

Improvement in golf may also be achieved by studying a player's swing and adjusting his or her posture and swing characteristics to maximize momentum, head speed, lie angle, impact location and the like. However, it may be difficult for a user to independently to determine head speed or an impact location of the golf ball against the golf club face. Additionally, having additional information regarding how (e.g., where) a golfer is hitting a golf ball with a golf club may allow the golfer to better improve his or her swing. Several factors affect a golfer's swing. For example, the lie angle, the loft angle, type of golf ball, and the club head angle of the club during impact with a golf ball greatly affect the trajectory of the ball.

Various analysis systems have been developed for analysis and communication of various golf swing performance metrics to a player. However, due to the inherent complexity of a golf swing, complex, and computationally-intensive processes may be required for analyzing a player's golf swing, wherein these processes may receive information related to one or more characteristics of a golf swing from one or more sensors. Analysis systems have been designed, in some instances, to be portable, and integrated into golf club structures such that analysis of a player's golf swing may be performed on a golf course during a round of golf. These portable analysis systems may consume power from portable power supplies, such as batteries, which are carried by a player during the round of golf. Accordingly, systems, methods, computer-readable media storing computer-executable instructions that will reduce the costs and improve the efficiencies and power consumption of such analysis systems would be a welcome advance in the art.

BRIEF SUMMARY

One or more of the above-mentioned needs in the art are satisfied by aspects described herein. According to one aspect, a golf club may be self contained and include sensors and transmitters located therewithin. As a result, the golf club can be used during a round of golf to analyze a golfer's characteristics without interfering with the golfer. In some embodiments, the golf club may wirelessly transmit golf swing characteristic data to a portable device, such as a personal digital assistant (PDA) or watch.

Aspects described herein relate to non-transitory machine-readable media (e.g., computer-readable media) with executable instructions for receiving golf swing data into a sampling rate processor on a golf club. The golf swing data may be received from a sensor on the golf club, wherein an analysis processor samples data from the sensor at various sampling rate. In one example, the processor may sample data from the sensor at a first sampling rate to classify a current movement of the golf club into one of a plurality of golf swing categories. The processor may further sample data at a second sampling rate based on the classified golf swing category. For example, different sampling rates may be used for different types of golf swing categories or classifications.

In another aspect, data may be received and/or sampled from a sensor on a golf club at a first sampling rate. The analysis processor may subsequently identify one or more golf swing characteristics from the received data, and compare one or golf swing characteristics to a stored golf swing sample, threshold or predefined rule. Subsequently, a sampling rate processor may select a second sampling rate at which the analysis processor is to sample the sensor data, based on the comparison of the received data to a stored golf swing sample.

In yet another aspect, a golf club may be a self-contained instrumented golf club with a golf club head, a shaft, and a sensor for capturing data related to one or more metrics of a golf swing. The instrumented golf club further includes a sampling rate processor, which is configured to select a sampling rate at which the sensor is to capture golf swing data.

According to further aspects, a golf club or a golf swing analysis device may dynamically modify a sampling rate of one or more sensors in response to certain triggers. For example, triggers may relate to an amount of time since a swing was initiated (e.g., back swing or fore swing), detecting a threshold velocity or acceleration of the club head, detecting a change in direction of acceleration of the club head and the like and/or combinations thereof. In some arrangements, the triggers (e.g., trigger times, threshold velocity or acceleration, etc.) may be determined based on a population of one or more sample swings or practice swings by a golfer.

The various aspects described herein may further be applied to a variety of sporting equipment types and for a variety of sport equipment characteristics and metrics.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and not limited in the accompanying figures in which like reference numerals indicate similar elements and in which.

DETAILED DESCRIPTION

In the following description of various example structures in accordance with the invention, reference is made to the accompanying drawings, which form a part hereof, and in which are shown by way of illustration various example golf club structures in accordance with the invention. Additionally, it is to be understood that other specific arrangements of parts and structures may be utilized, and structural and functional modifications may be made without departing from the scope of the present invention. Also, while the terms "top," "bottom," "front," "back," "rear," "side," "underside," "overhead," and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

Additionally, while the embodiments described herein may be directed toward golf and golf equipment, similar aspects may be applied and used for other types of sports and sports equipment.

General Description of Dynamic Sampling in a Golf Club According to Various Examples In general, aspects described herein relate to use of dynamic sampling in a golf analysis system for improved analysis performance. For example, dynamic sampling may be used to adjust sampling rates for one or more analysis parameters based on a golf shot-type to be performed by a user or a current state of the user's swing. In some examples, dynamic sampling may be used to adjust one or more analysis parameters in order to reduce power consumption by an analysis system.

Figure 1:
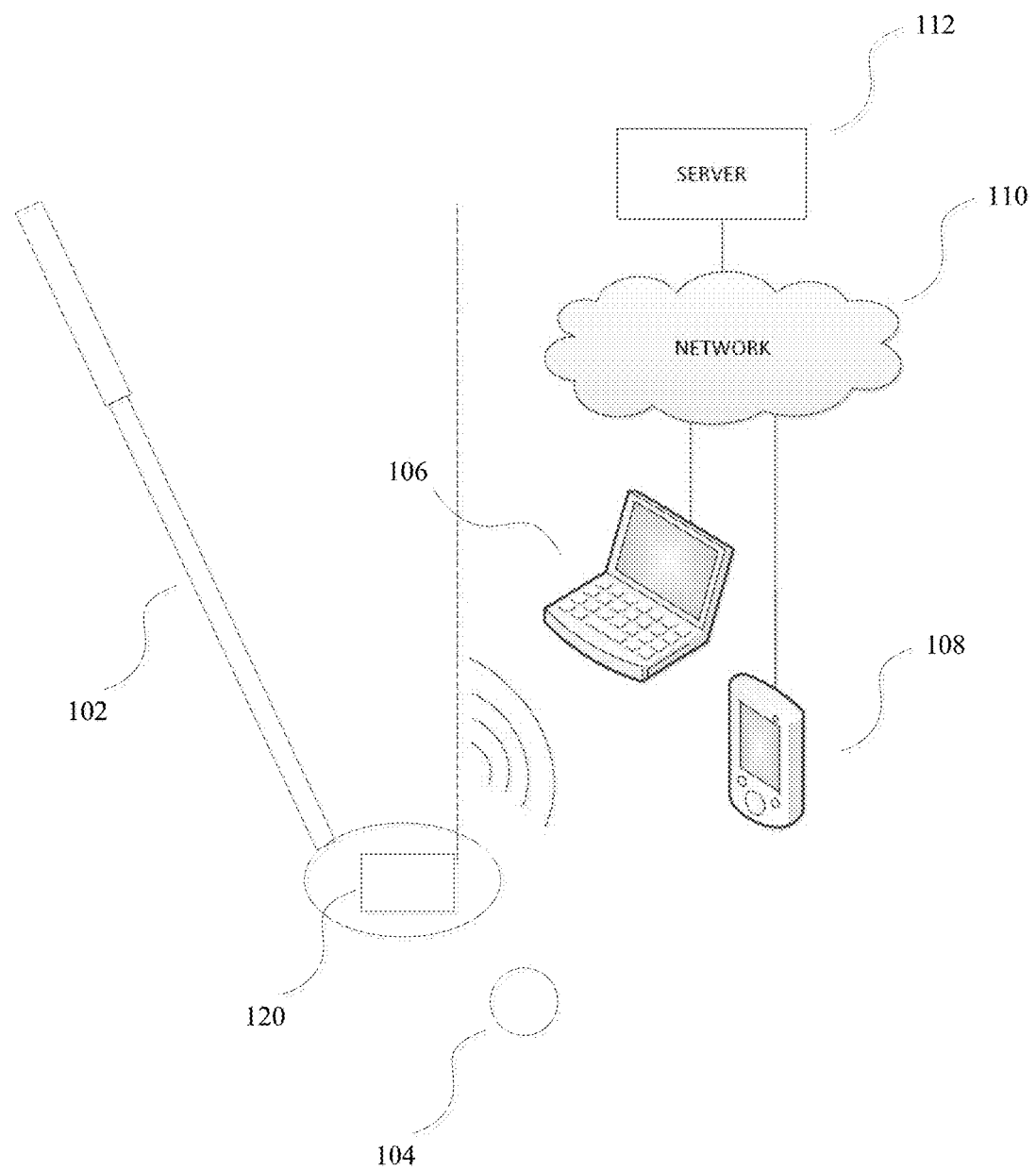
FIG. 1 illustrates an example system and environment in which various aspects of this disclosure may be used and implemented.

FIG. 1 illustrates an example system and environment 100 in which various aspects described herein may be used and implemented. In particular, system and environment 100 includes a golf club 102, a golf ball 104, a personal computer 106, a mobile communication device 108, a network 110, and a server 112, wherein golf club 102 further includes a sensor device 120. Golf club 102 may be a wood, iron, putter, hybrid, or specialty club. In one embodiment, one or more golf swing, or golf equipment performance metrics may be determined by, and/or received by, personal computer 103 or mobile communication device 105. Mobile communication device 105 may comprise a tablet computer, a personal data assistant (PDA), a smartphone, and/or combinations thereof. Personal computer 103 may include laptop computers or desktop computers. Devices 103 and 105 may be connected to network 107 to a variety of other devices and destinations including server 109. Server 109 may be configured to collect data from various user devices as well as to distribute information such as fitness challenges, golf recommendations (e.g., equipment recommendations), product offers, and the like. Communication between two or more of golf club 102, golf ball 104, personal computer 106, and mobile communication device 108, or combinations thereof, may be facilitated by wired or wireless communication through network 110. Network 110 may be configured to communicate using, among others short range or long range technologies, and may include Wi-Fi, BLUETOOTH, infrared, satellite communications, cellular communications, or any wireless communication technology or protocol. Alternatively, it will be readily apparent to those of skill, that network 110 may facilitate wired communication between one or more of, golf club 102, golf ball 104, personal computer 106, mobile communication device 108, or combinations thereof. Wired communication may be facilitated by, among others Ethernet cabling, or any other wiring technology configured communication analog or digital signals. Furthermore, network 110 may be, for example, a local area network (LAN), wide-area network (WAN), storage area network (SAN), the Internet, or any other network type, or combinations thereof Generally, golf club 102 or golf ball 104, or combinations thereof, may communicate data to one or more of device 106, or device 108. The communicated data may be, in one embodiment, raw data, or, in another embodiment, processed data representative of one or more golf swing, or golf shot, performance metrics.

In one implementation, golf club 102 is configured with a sensor device 120, wherein sensor device 120 includes one or more sensors. These sensors may further be configured to measure, sense, detect or otherwise determine one or more attributes (metrics) related to a golf swing, wherein such attributes may include, among others: speed, acceleration, orientation, location, or distance from an object, or combinations thereof. Accordingly, the one or more sensors of sensor device 120 may include, among other types of modules: accelerometers, gyroscopes, electromagnetic sensors, sound sensors (microphones), force (impact) sensors, global positioning system (GPS) sensors, or magnetic field sensors, or combinations thereof In one or more arrangements, it may be desirable to dynamically adjust one or more sampling rates at which data is received from one or more of the aforementioned sensors. In this way, improved performance, and/or reduced power consumption during golf swing analysis may be achieved.

Figure 2:
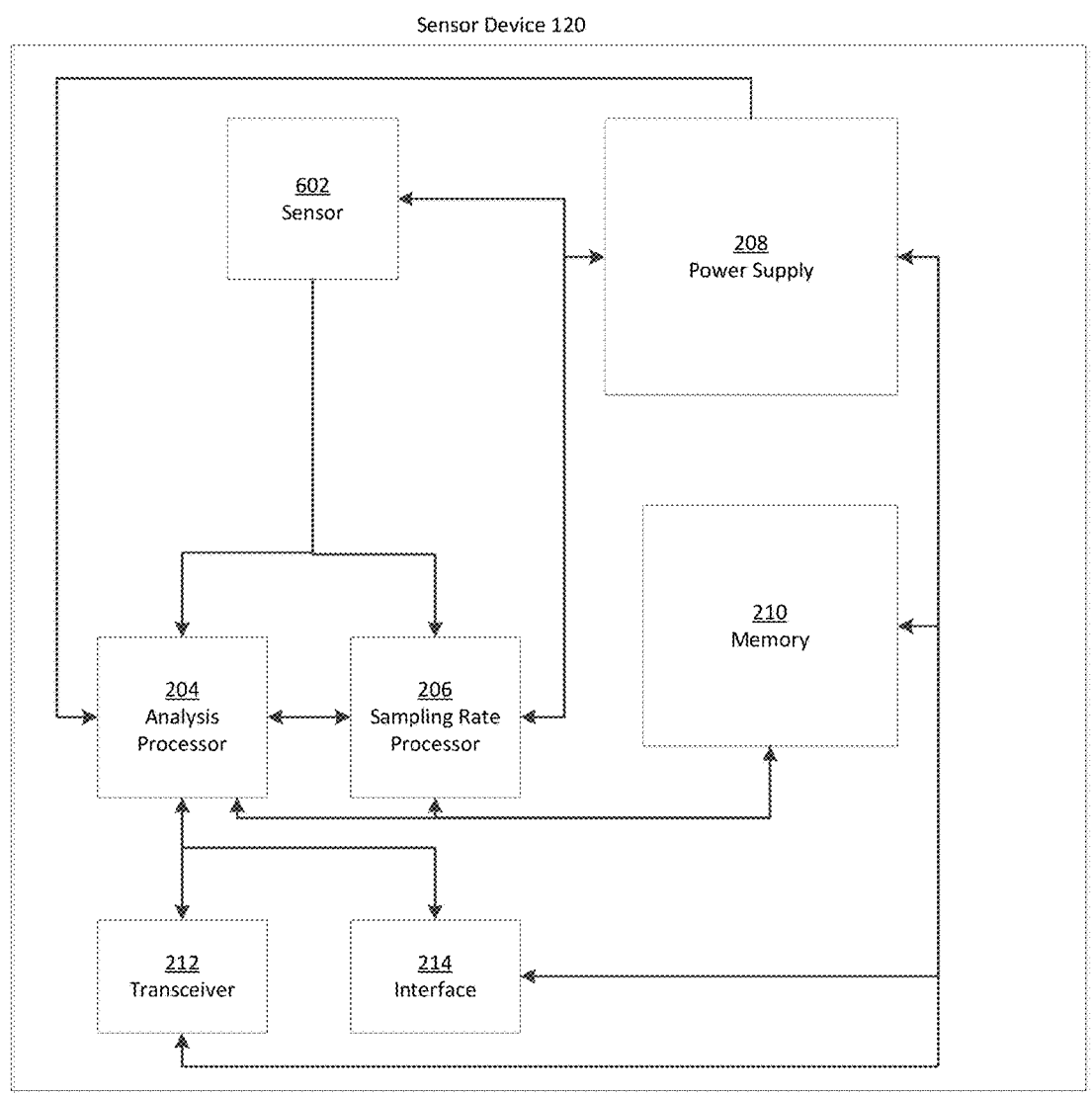
FIG. 2 is a schematic block diagram of a sensor device.

FIG. 2 is a schematic block diagram of sensor device 120 from FIG. 1. Specifically, sensor device 120 includes, among others, sensor 202, analysis processor 204, sampling rate processor 206, power supply 208, a memory 210, transceiver 212, and interface 214. As depicted in FIG. 2, components 202-214 of sensor device 120 may be configured as a single integrated circuit, however one of ordinary skill will realize that components 202-214 may alternatively be implemented on separate application-specific integrated circuits (ASICs). Alternatively, components 202-214 may be implemented using, among others: general-purpose integrated circuits, distributed hardware, or shared hardware, or combinations thereof. Components 202-214 may also be configured such that one or more processes carried out by a respective component 202-214 are executed by, in one implementation, one or more processor cores of a computational system, wherein the one or more processes may be executed in parallel, or sequentially (in series). In one example, analysis processor 204 and sampling rate processor 206 may correspond to a single processor.

Sensor 202 may be a single sensor, or represent a group of sensors of a same type, or of different types. In one configuration, sensor 202 may be: an accelerometer, a gyroscope, an electromagnetic sensor, a microphone, a force sensor, a magnetic field sensor, a GPS, a resistivity sensor, a wind speed and/or wind direction sensor, an image sensor (camera), or combinations thereof In another configuration, sensor 202 may be configured to receive information from device 106 or device 108 related to the golf course conditions, or weather conditions, among others, wherein such information may be downloaded from the Internet. Sensor 202 may output an analog or a digital signal corresponding to a physical quantity, wherein an analog output may be a continuous voltage signal with a time-varying frequency and amplitude corresponding to the frequency and magnitude of the physical quantity to which the sensor is sensitive. Alternatively, a digital output may be a pulse-width modulated signal, which has been transduced from a corresponding analog signal generated by a sensor.

Data output (e.g., golf shot performance metrics) from sensor 202 may be received by analysis processor 204, wherein analysis processor 204 is configured to execute one or more processes for determining, among others, one or more golf swing/golf shot categories, and/or one or more golf swing/golf shot characteristics. Golf shot categories may include external factors that may influence a golf swing or golf shot. These categories include, among others, a lie of a golf ball on the golf course, and the weather conditions. Golf shot characteristics may include metrics associated with the manner in which a user swings a golf club to perform a golf shot. These characteristics may include, among others, backswing speed, and downswing speed, and the like. Subsequently, the one or more golf swing, or golf shot characteristics and categories, as determined by an analysis processor 204, may be communicated to a player using transceiver 212, or interface 214. Transceiver 212 may communicate through network 110 from FIG. 1, wherein this communication may use one or more of Bluetooth, Wi-Fi, cellular communication, or any available wireless transmission protocol, or combinations thereof. Furthermore, interface 214 may facilitate wired communication of one or more processed performance metrics, and may be a universal serial bus (USB) port, an Ethernet port, and the like. Interface 214 may also communicate one or more performance metrics to a player via one or more visual, audio, or haptic indicators, or combination thereof, on golf club 102.

The one or more processes executed by analysis processor 204 may be executed according to non-transient, machine-executable instructions stored in memory 210, wherein memory 210 may be a form of persistent memory including one or more of: a hard disk drive (HDD), a solid state drive (SSD), a read only memory (ROM), a register circuit, an optical disk (CD, DVD), a magnetic tape, or combinations thereof. Alternatively, memory 210 may be a form of volatile memory that is generally cleared by a reboot or power cycle operation of sensor device 120, and wherein memory 210 may be a random access memory (RAM), among others.

According to some aspects, sensor device 120 is configured to be positioned on, or within, a golf club 102. In another implementation, sensor device 120 is configured such that one or more components 202-214 are physically separate from, but in communication with a sensor-equipped golf club 102, and such that sensor device 120 is configured to be portable. In order to facilitate portability, sensor device 120 may consume electrical energy from power supply 208. Power supply 208 may be a form of stored chemical energy, such as a cell, or group of cells (commonly referred to as a battery). Alternatively or additionally, power supply 208 may be implemented using one or more of a combination of other technologies, including solar cells, capacitors, which may be configured to store electrical energy harvested from the motion of device 120, a supply of electrical energy by "wireless" induction, or a wired supply of electrical energy from a mains outlet, such as a universal serial bus (USB 1.0/1.1/2.0/3.0, and the like).

Analysis processor 204 may sample data from sensor 202 at a first sampling rate, wherein the first sampling rate may be a last-used sampling rate by sensor device 120 prior to a reboot, sleep, hibernation, or power-down operation. In another example, the first sampling rate may be a default sampling rate at which analysis processor 204 samples data from sensor 202 upon initialization of analysis processor 204. In yet other examples, the first sampling rate is communicated to analysis processor 204 by sampling rate processor 206 as a default sampling rate. Sampling rate processor 206 may, in one implementation, receive data from sensor 202 and execute one or more processes to select a sampling rate. In one implementation, sampling rate processor 206 may select a sampling rate at which an analysis processor 204 is to sample sensor data based on a golf swing category into which the data received from sensor 202 is categorized.

In this way, analysis processor 204 may execute one or more processes to categorize data received (e.g., at the first sampling rate) from sensor 202 into one or more golf swing categories. Golf swing categories may include, among others: a club type category, a distance-to-target category, a lie-type, a course conditions category, a weather conditions category, and a wind direction category, among others. For example, analysis processor 204 may execute one or more processes to categorize data received from sensor 202 into a golf swing category, wherein a club type may be communicated as a unique identification number from sensor 202, associated with a golf club 102, to analysis processor 204.

Alternatively or additionally, the club type may be manually specified by the user through the club 102 or a separate device (e.g., a mobile communication device). In some arrangements, a distance-to-target category may be determined based on the club type. For example, a first type of driver may generally be configured to propel a golf ball a first range of distances while a second type of driver may generally be configured to propel a golf ball a second range of distances. Accordingly, the general range configuration of a club type may be used to categorize the golf swing into a distance-to-target category.

In another example, analysis processor 204 may categorize received data into a lie-type category indicative of a lie, or a localized positioning of a golf ball on the golf course. Categorization of a lie-type may be based on, among others, an input from a player, or a resistivity measurement by a resistivity sensor on golf club 102 of the resistance of the ground adjacent to a golf ball. One or more resistivity measurements may be taken when the golf club 102 is "grounded," or positioned with the head of the golf club 102 on the surface of the golf course prior to commencing a golf shot. In turn, memory 210 may store one or more resistivity samples corresponding to different lie-types, e.g., a grass length indicative of a golf ball positioned on a fairway, or a grass length indicative of a golf ball positioned in light rough, and the like. Further, analysis processor 204 may execute one or more processes to search memory 210 for a resistivity sample corresponding to one or more resistivity data points received from sensor 202.

According to other aspects, categorization of a lie-type may be based on one or more images of the localized position of a golf ball on the golf course. For example, a camera sensor may detect that the area surrounding a golf ball on the golf course is white in color, wherein a white color may be indicative of the golf ball being in a sand trap. In addition to color, contrast, brightness, color density and the like may also be used to analyze the lie-type based on an image.

Weather conditions may similarly be detected based on image or video-capture. Alternatively or additionally, weather conditions may be detected based on temperature sensors, barometric pressure sensors, user input, moisture detectors and the like and/or combinations thereof Analysis processor 204 may categorize data received from sensor 202 into a golf swing category based on a value of data received from sensor 202 corresponding to one or more threshold values (or golf swing samples), wherein one or more threshold values may be stored in memory 210. In another example, sensor 202 may be an accelerometer, specifically a three-axis (x-, y-, and z-axis) accelerometer implemented as a single integrated circuit, or "chip", wherein acceleration in one or more of the three axes is detected as a change in capacitance across a silicon structure of a micro-electromechanical system (MEMS) device. Accordingly, a three-axis accelerometer may be used to resolve an acceleration in any direction in three-dimensional space. Furthermore, the accelerometer may output a signal indicative of one or more accelerations as a continuous voltage signal (analog signal) with a time varying frequency and amplitude. Accordingly, one or more threshold values stored in memory 210 may correspond to one or more accelerometer frequency, and amplitude values, among others.

Sampling rate processor 206 may execute one or more processes to select a sampling rate at which analysis processor 204 is to sample data from sensor 202. Selection of a sampling rate by sampling rate processor 206, may, in one example, be based upon a golf swing category into which the data from sensor 202 is categorized. In this way, sampling rate processor 206 may execute one or more processes to select a sampling rate corresponding to a golf swing category. For example, a table of sampling rates corresponding to golf swing categories may be stored in memory 210, such that sampling rate processor 206 may execute an iterative search through the stored table upon receipt of a golf swing category into which the data has been categorized. Various other search, or polling, method may be used by sampling rate processor 206 for searching memory 210.

According to one arrangement, analysis processor 204 samples data from sensor 202 at a first sampling rate to categorize data into a golf swing category, wherein the first sampling rate may be a last-used sampling rate, or a default sampling rate, among others. An iterative search, executed by sampling rate processor 206, may select and communicate a second sampling rate to analysis processor 204, wherein analysis processor 204 may subsequently sample data from sensor 202 at the second sampling rate. In another implementation, sampling rate processor 206 receives data from sensor 202 before, or simultaneously to, analysis processor 204. In response, sampling rate processor 206, may execute one or more processes to compare the data received from sensor 202 to one or more threshold values, wherein one or more threshold values may be stored in a table structure in memory 210 with corresponding sampling rates. In one example, an average magnitude of a voltage signal from an accelerometer, indicative of a magnitude of acceleration, may be received by sampling rate processor 206, and in response, compared to one or more stored threshold values. Sampling rate processor 206 may compare received data to stored threshold values by iteratively searching through a table of acceleration magnitude threshold values stored in memory 210.

Threshold values, stored in memory 210, may include amplitude threshold values, frequency threshold values, amplitude change threshold values, or frequency change threshold values, among others. Accordingly, a stored threshold value may correspond to one or more stored sampling rates.

According to some aspects, different portions of a golf swing may be detected using different sample rates. For example, a moment of impact between a club head and the golf ball (and/or a short time surrounding this moment) may be detected using a higher sampling rate to more particularly determine swing characteristics since the moment of impact may provide important information about the golfer's performance. In contrast, and in one example, a golfer's backswing might be detected using a different (e.g., lower) sampling rate, since the sensor data, during this time, might not exhibit as many rapid changes. To account for the different portions of the golf swing, different sampling rates may be defined. Upon detecting a particular portion of the golf swing, a corresponding sample rate may be used. These changes in sampling rate may occur during the swing (e.g., after a swing has started and prior to impact with a golf ball or prior to the golfer's follow through).

To detect the various portions of a golf swing, one or more triggers may be defined. Triggers may correspond to threshold values of sensor data, time triggers, user input and the like. In one example, such triggers may be determined based on a population of sample golf swings performed by the user. Sample golf swings may be captured and/or stored during a training mode or during normal play as described in further detail below. In some examples, the user may specify that a golf swing is to be used in determining such triggers (e.g., to be added to the population of sample golf swings from which triggers are to be determined). In response, the analysis processor 204, for example, may store the golf swing into the population of sample data.

According to some arrangements, sampling rate processor 206 executes one or more processes to select a sampling rate at which analysis processor 204 samples data from sensor 202 based on one or more stored golf swing samples stored from training data representative of a user's golf swing. Specifically, during an example training mode, analysis processor 204 may execute processes requesting a user to perform, in one implementation, three "drive," or "tee," shots using a driver golf club, and the like. Analysis processor 204 may execute one or more processes to identify, from data received from sensor 202, one or more characteristics (otherwise referred to as metrics, patterns, or trends) of the user's drive golf shot, and store these characteristics as user golf swing samples. These one or more characteristics may include, among others, a golf club lie angle, an impact angle, a golf club head orientation, a number of practice shots before hitting a golf ball, a backswing speed, a backswing time, a downswing speed, a downswing time, a follow-through distance, and a follow-through time, among others. The one or more characteristics may be further broken down into one or more outputs from sensor 202, wherein an output from sensor 202 may be an amplitude value, or a frequency value, among others.

It is noted that a golf shot, or golf swing, may be broken down into a backswing, a downswing, a moment of impact with the golf ball and a follow-through, among others. A backswing may be a portion of a golf swing that includes raising a head of a golf club from a position substantially at ground level, or addressing (positioning the golf club closely behind) a golf ball, to a position with the head of the golf club spaced apart from the golf ball. A downswing may be a portion of a golf swing that includes moving the head of the golf club from a position spaced apart from the golf ball, to a position at which the golf club head is in contact with the golf ball, wherein upon contact of the golf club head and the golf ball, the golf club imparts kinetic energy onto the golf ball. A follow-through may be a portion of a golf swing including an impulse of a golf club head and a golf ball (the impulse is the time during which the golf club head is in contact with the golf ball), and the movement of the golf club head after impact with the golf ball.

In some arrangements, analyzing a population of one or more sample golf swings to determine sampling rate change triggers may include determining an amount of time between various events. For example, an amount of time between swing initiation (e.g., start of a backswing) and golf ball impact may be determined. This time may then be used to trigger activation of a higher sampling rate shortly before an expected golf ball impact in future shots. In another example, an amount of time between swing initiation and the start of the downswing may be determined to trigger activation of a higher sampling rate during the downswing and into the moment of impact. In yet another example, a threshold (or trigger) velocity or acceleration after start of a golfer's downswing and prior to golf ball impact may be determined from the sample data population. According, upon detecting the threshold or trigger velocity or acceleration (e.g., during the downswing), the sampling rate may be modified. In yet other examples, triggering conditions (e.g., times, threshold velocities, accelerations or other metrics) may be manually defined by the user.

The above noted sampling rate change triggers may be specific to a golfer, a club type, a club model, a golf course, a par-level for a course, particular weather conditions (e.g., rain, sunny, windy), and the like and/or combinations thereof. Accordingly, the population of sample data may be categorized into different groups depending on various characteristics such as the aforementioned attributes. Each group may then be evaluated separately to derive the various triggering conditions In some examples, when detecting and storing a golf swing as a sample, sampling rate processor 206 may instruct analysis processor 204 to sample golf swing data at a first sampling rate that may be a higher or upper (e.g., maximum) sampling rate. Analysis processor 204 may store one or more data points, or golf swing samples, obtained from sensor data sampled at this upper sampling rate. Subsequently, sampling rate processor 206 may instruct analysis processor 204 to sample golf swing data, for a same golf shot type, at one or more lower sampling rates. Analysis processor 204 may again execute one or more processes to identify one or more characteristics, or golf swing samples, from sensor data sampled at lower sampling rates. Analysis processor 204 may subsequently execute one or more processes to compare golf swing samples, calculated at an upper sampling rate, to golf swing samples calculated using lower sampling rates. In one embodiment, analysis processor 204 may identify a lower sampling rate at which a golf swing sample is substantially similar to a corresponding golf swing sample calculated from data sampled at an upper sampling rate. A threshold of similarity may be defined by maximum amount of deviation between metrics determined from the higher sampling rate sample and the lower sampling rate sample. In response, sampling rate processor 206 may store the lower sampling rate in combination with a golf swing sample. In another embodiment, analysis processor 204 identifies one or more sampling rates that are lower than an upper sampling rate, and corresponding to one or more portions of a golf shot that are similar to one or more portions of a golf shot calculated from data sampled at an upper sampling rate. For example, analysis processor 204 may execute, during a training mode, one or more processes to compare a golf swing sample of a user's golf drive shot sampled from sensor data at an upper sampling rate, to one or more golf swing samples of a golf drive shot sampled at one or more lower sampling rates. Analysis processor 204 may determine that the back swing portion of a golf drive shot, when sampled at an upper sampling rate, is similar to the backswing portion of the golf drive shot when sampled at a lower sampling rate. In response, sampling rate processor 206 may store the lower sampling rate in combination with the backswing portion of the golf drive shot, for a given user.

In some examples, sampling rate processor 206 may store one or more sampling rates corresponding to one or more characteristics of a golf shot using default, or predetermined sampling rate values. For example, sampling rate processor 206 may store one or more sampling rates corresponding to one or more golf shot types based on default values for golf swing characteristics, including: backswing speed, backswing time, downswing speed, downswing time, and follow-through time, among others. Accordingly, if data received from sensor 202 corresponds to one or more default golf swing characteristics, sampling rate processor 206 instructs analysis processor 204 to sample data at a sampling rate corresponding to the one or more default golf swing characteristics.

Sampling rates communicated by sampling rate processor 206 to analysis processor 204 may correspond to sampling rates in accordance with the Nyquist sampling theorem (or Nyquist-Shannon sampling theorem), which states that in order to be able to accurately reproduce a signal, it should be sampled at a frequency of at least double the highest frequency present in the signal. For example, for acceleration data received from sensor 202 that includes a range of frequencies, ranging from 25 Hz to 100 Hz, the Nyquist sampling theorem states that in order to accurately reproduce the received acceleration data, it should be sampled at a sampling rate of at least 200 Hz. However, in other implementations, the sampling rate corresponding to stored thresholds in memory 210 do not consider the Nyquist sampling theorem.

Sampling rate processor 206 may determine that data received from sensor 202 corresponds to a threshold value if, among others, the received data is within a predetermined range of, closest to, but greater than, or equal to, a stored threshold value. Upon determination, by sampling rate processor 206, that data received from sensor 202 corresponds to a stored threshold value, sampling rate processor 206 may communicate a sampling rate, corresponding to the stored threshold value, to analysis processor 204 as a second sampling rate at which to sample data from sensor 202.

According to one or more aspects, sampling rate processor 206, upon classification of data from sensor 202 into one or more golf swing categories, or upon determination of a golf swing characteristic corresponding to the data received from sensor 202, may select one or more new sensors. The one or more new sensors may be in addition to sensor 202, or may replace sensor 202, such that sampling rate processor 206 executes one or more processes to determine one or more new sensors that are appropriate for collecting data related to a particular golf swing category or characteristic. For example, data received from a sensor 202, embodied as an accelerometer, is classified into a golf swing category corresponding to a "drive" shot. In response, sampling rate processor 206 may select a new gyroscope sensor from which to receive data instead of the accelerometer, wherein it is determined that a gyroscope sensor is more appropriate for collecting data related to a "drive" shot.

Advantageously, sampling rate processor 206 may reduce power consumption from power supply 208, by, among others, analysis processor 204. In one example, a reduction in power consumption by analysis processor 204 leads to an increase in time between recharges of a battery supplying power to a portable sensor device 120 in golf club 102. For example, if analysis processor 204 consumes a significant portion of the total energy used by sensor device 120, when sampling and analyzing data from sensor 202 at a high, or an upper sampling rate, reduction in power consumption may significantly improve battery life. In a particular example, analysis processor 204 may sample sensor data from sensor 202 at an upper sampling rate of 50 Hz, and consume 95% of the total electrical energy of sensor device 120. It is further assumed that using a sampling rate that is below a high, or upper sampling rate associated with analysis processor 204 could lead to significant reductions in power consumption. For example, if the sampling rate of the analysis processor 204 is reduced to 24 Hz, the power consumption of sensor device 120 may be reduced by 50%. Correspondingly, when the sampling rate of analysis processor 204 is reduced from 50 Hz to 24 Hz, the battery life may be doubled.

Figure 3:
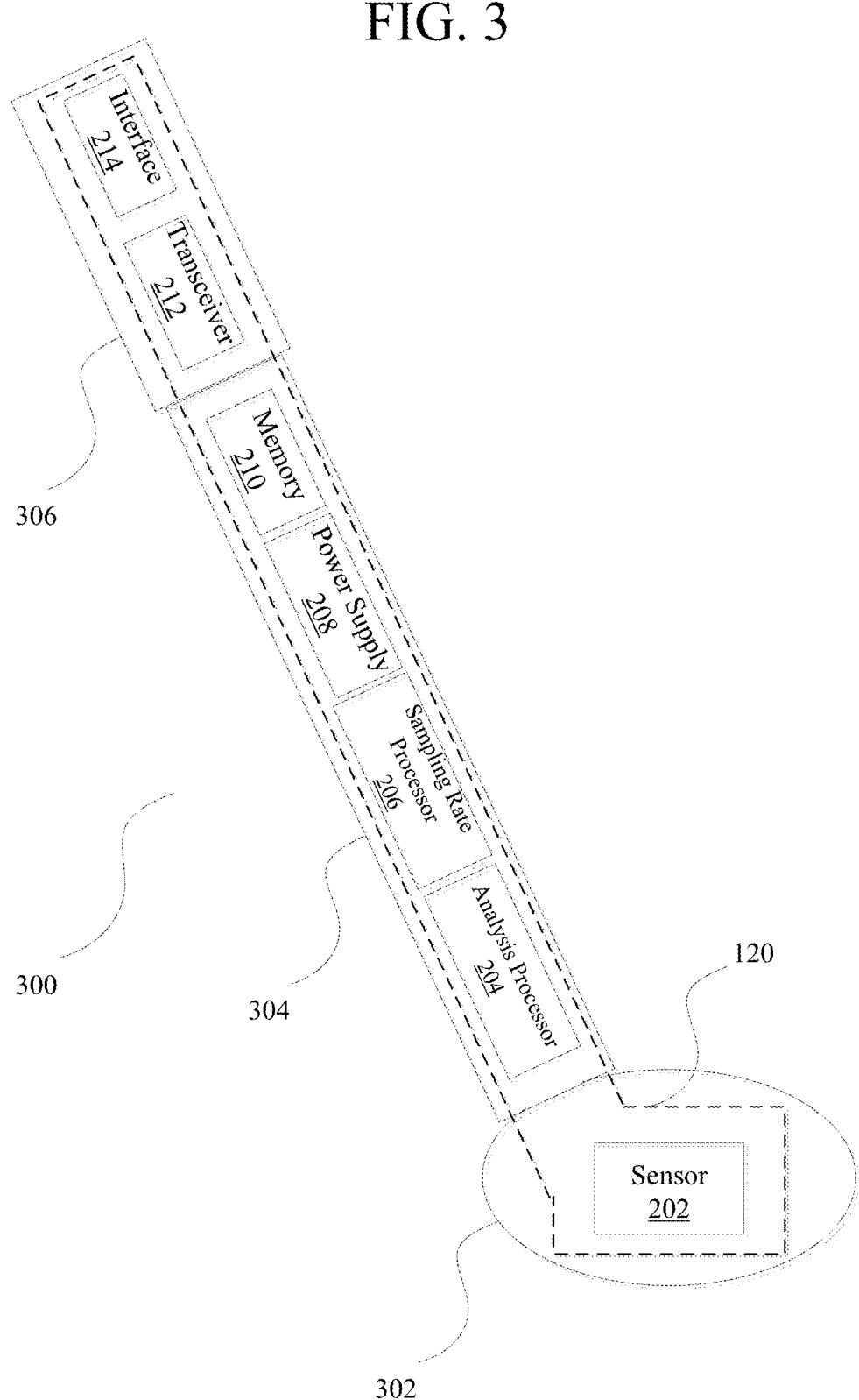
FIG. 3 is a schematic block diagram of an exemplary embodiment of an instrumented golf club.

FIG. 3 is a schematic block diagram of an exemplary embodiment of a golf club 300 that includes a sensor device 120. In particular, golf club 300 comprises a golf club head 302, a golf club shaft 304, a golf club grip 306, a sensor 202, an analysis processor 204, a sampling rate processor 206, a power supply 208, a memory 210, a transceiver 212, and an interface 214. Golf club 300 from FIG. 3 may be similar to golf club 102 from FIG. 1, such that a golf club 300 may communicate via network 110 with a personal computer device 106, or a mobile communication device 108. As depicted, golf club 300 is configured with sensor 202 positioned in a golf club head 302. However, it will be readily apparent to one of ordinary skill that sensor 202 may be positioned in golf club shaft 304, or golf club grip 306, among others. Similarly, although components 204 to 214, as depicted, or positioned, in the golf club shaft 304, one or more of components 204 to 214 may alternatively be positioned in golf club grip 306 or golf club head 302, among others.

Figure 4:
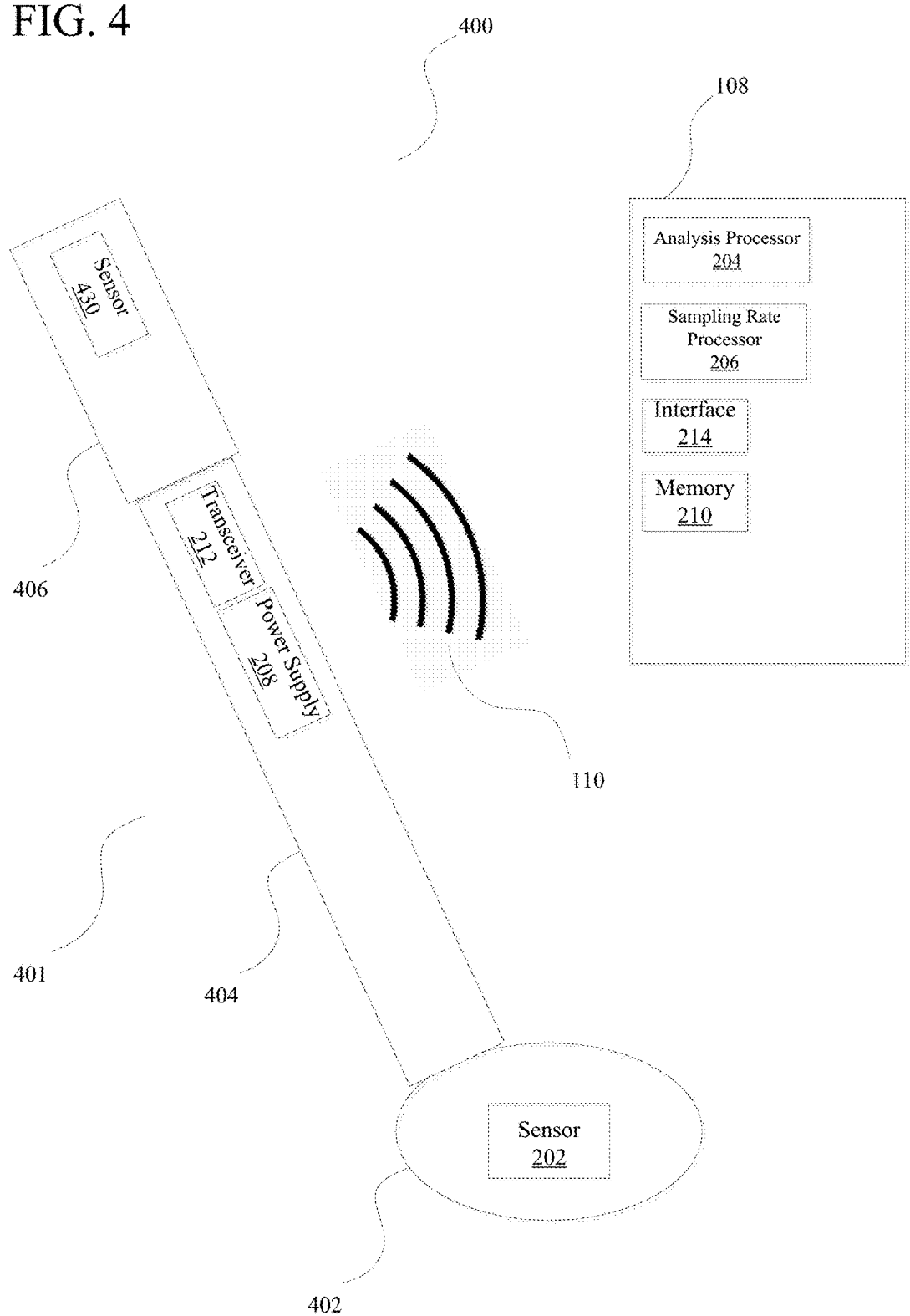
FIG. 4 is a schematic block diagram of an alternative implementation of an instrumented golf club.

FIG. 4 is a schematic block diagram of an alternative implementation of a golf swing analysis system 400. In particular, system 400 includes a golf club 401, a golf club head 402, a golf club shaft 404, a golf club grip 406, a sensor 202, a sensor 430, a power supply 208, a transceiver 212, a network 110, a mobile communication device 108, an analysis processor 204 a sampling rate processor 206, a memory 210, and an interface 214. FIG. 4 depicts golf club 401 with a first sensor 202, and a second sensor 430, wherein one or more of sensor 202, and sensor 430 may represent one or more sensors of a same type, or of a different type. Furthermore, golf club 401 indicates that sensor 202, and sensor 430 may be positioned within, or on, golf club 401 such that sensor 202 and sensor 430 are spaced apart from one another. As depicted in FIG. 4, sensor 202 is positioned within golf club head 402, and sensor 430 is positioned within golf club grip 406, however it will be readily apparent one of ordinary skill that sensor 202 and sensor 430 may be positioned within one or more of golf club head 402, golf club shaft 404, or golf club grip 406.

As depicted, one or more of components 202 to 214 may communicate via network 110. In particular, power supply 208 and transceiver 212 are positioned within golf club shaft 404, and analysis processor 204, sampling rate processor 206, memory 210, and interface 214 are positioned within the mobile communication device 108. Again, it will be readily apparent to one of ordinary skill that system 400 may be configured such that one or more components 202 to 214 are in wireless communication with one another via network 110, without departing from the spirit of the disclosure described in relation to components 202 to 214, from FIG. 2.

Figure 5:
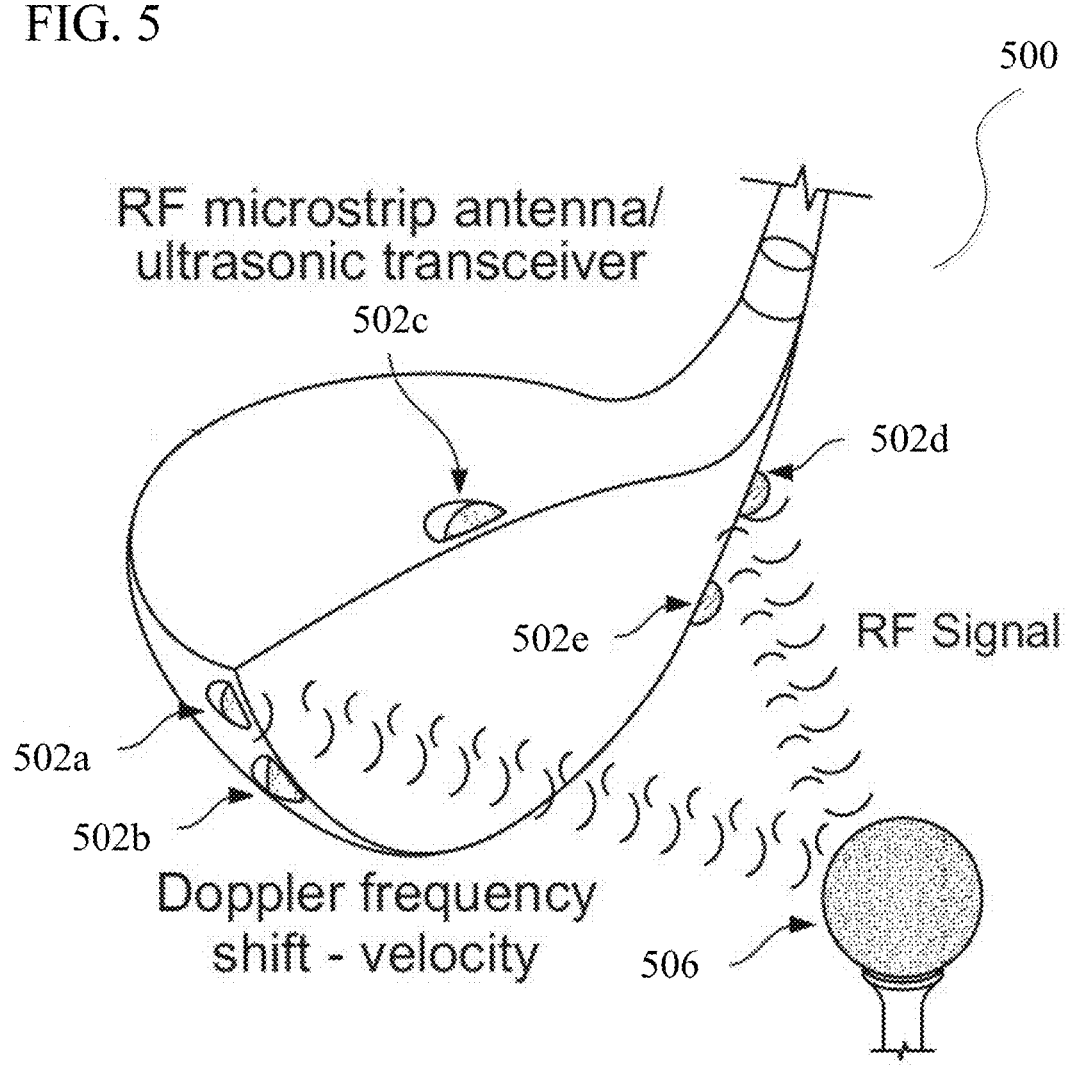
FIG. 5 depicts one implementation of an instrumented golf club with a golf club head configured with electromagnetic sensors.

FIG. 5 illustrates an example golf club head 500, configured with electromagnetic sensors. In one embodiment, golf club 102 from FIG. 1 may comprise a golf club head similar to golf club head 500. In another example, one or more of sensors 502a-502e may be similar to sensor 202 from FIG. 2. That is, golf club head 500 comprises electromagnetic sensors, such as radio frequency sensors, or ultrasound sensors 502a-502e. Sensors 502a-502e may be attached to or embedded in golf club head 500. In one embodiment, sensors 502a-502e are implemented with microstrip antennas. One skilled in the art will appreciate that one or more of sensors 502a-502e may emit electromagnetic radiation or ultrasound waves. Alternatively, electromagnetic radiation may be emitted by another source that may be attached to or embedded within golf club head 500.

When electromagnetic sensors are used, club head speed may be determined by measuring the Doppler frequency shift of waves reflected from a ball 506. Golf club head 500, or another part of the golf club may include a module for determining the Doppler frequency shift. Impact location may be determined by measuring the phase shift of reflected signals from ball 506 just prior to impact, such as 15 cm prior to impact. A frequency of 2 GHz may be used for a wavelength of 15 cm. The phase shifts correspond to distances. The accuracy of the determination of the impact location may be increased by using more sensors. In one embodiment three sensors are used for determining impact location. Swing tempo may be determined by using the sensors as proximity sensors. For example, the sensors may be used to determine when golf club head 500 is in close proximity to ball 506 just prior to back swing and then before impact. The time period between the two measurements corresponds to the swing tempo.

Ultrasound sensors may function in a similar manner. A number of ultrasound sensors, such as 2-5 may be attached to or embedded in the head of a golf club. Club head speed may be determined by measuring a frequency shift in a signal reflected from a ball. For example, with a transducer of 40 kHz, a club head speed of 130 mph would result in a 70 kHz reflection. A number of ultrasound sensors placed around the face of the club, such as two along each side and one on the top, may be used to determine impact location. The time of flight of each signal just prior to impact corresponds to the distance between the ball and the sensor. The individual distances may be used to determine impact location. Ultrasound sensors may also function as proximity sensors to determine swing tempo in the manner described above.

In alternative examples, electromagnetic or ultrasound sensors may be placed in or attached to a golfer's shoes to perform the functions similar to those described above. The sensors detect movement of the club head which can be used to determine golf swing parameters.

Figure 6:
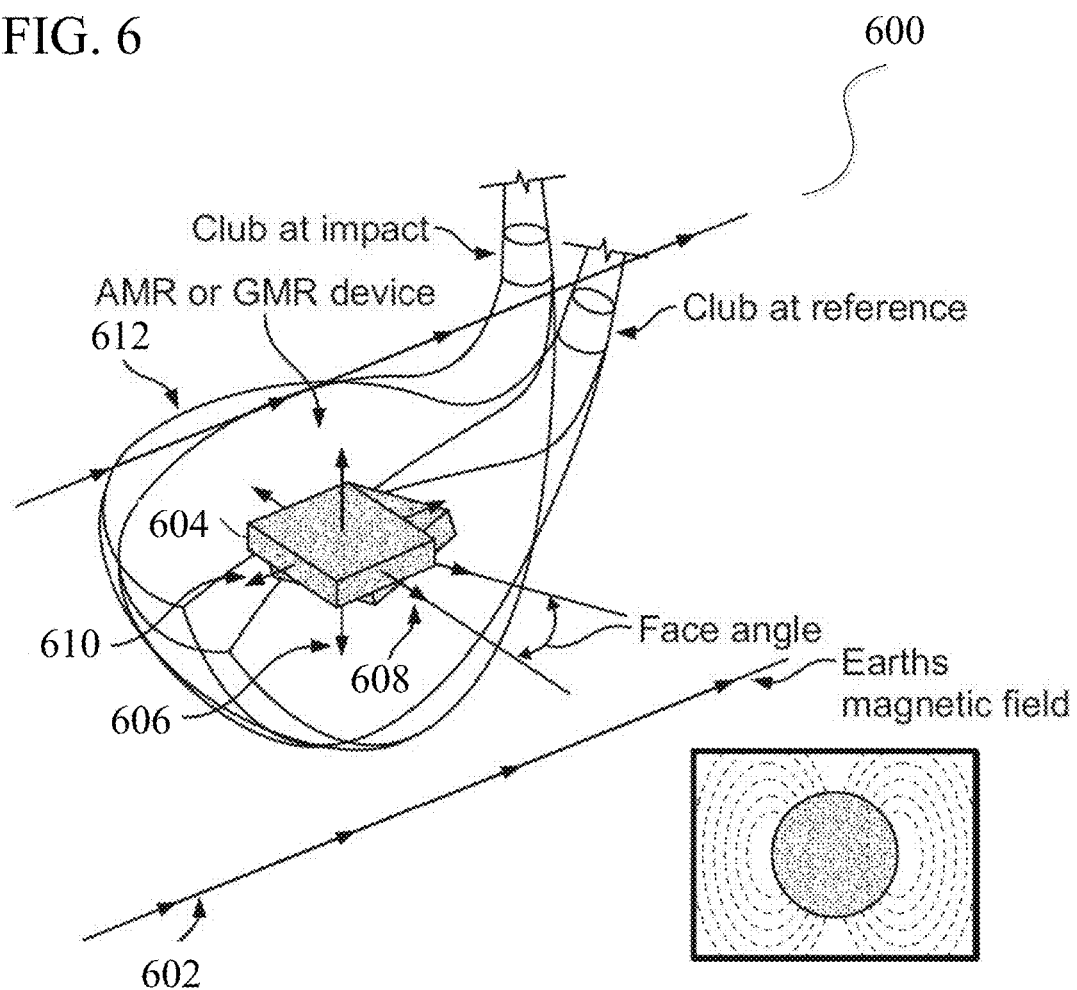
FIG. 6 depicts another implementation of an instrumented golf club with a golf club head configured with magnetic field sensors.

FIG. 6 illustrates another example golf club head 600, configured with magnetic field sensors 604. In one implementation, golf club 102 from FIG. 1 may comprise a golf club head similar to golf club head 600. In another implementation, a magnetic field sensor 604 may be similar to sensor 202 from FIG. 2. The earth's magnetic field may also be used to determine golf swing parameters. Magnetic field sensors may be attached to or embedded within a golf club to detect components of the earth's magnetic field at different club locations. As shown in FIG. 6, the earth's magnetic field represented by vector 602 is relatively constant in the vicinity of a golfer. A magnetic field sensor 604 resolves magnetic field vector 602 into three component vectors 606, 608 and 610. Magnetic field sensor 604 may be implemented with an anisotropic magnetoresistive (AMR) device, a giant magnetoresistor (GMR) device or other suitable devices. As golf club head 600 moves, magnetic field vector 602 is resolved into component vectors 606, 608 and 610 such that the respective components have different magnitudes. The changing magnitudes of the component vectors may then be used to determine golf swing parameters.

The club head face angle may be determined by first taking a reference measurement of the magnetic field before the back swing and then taking another measurement of the magnetic field just prior to impact. For example, the magnitude of component vectors 606, 608 and 610 will have first values before the back swing and second values just prior to impact. The different component vector values can then be used to determine the face angle. If the magnetic field in the x-y plane is assumed to be 0.3 Gauss, the component X of the field with respect to component vector 608 (x axis) is determined by $X=0.3 \cos \theta$ and the component Y of the field with respect to component vector 610 (y axis) is determined by $Y=0.3 \sin \theta$.

A 1 degree difference would cause a change in the magnitudes of vector components 608 and 610 as follows:

$$\Delta X = 0.3(\cos \theta - \cos(\theta+1))$$

$$\Delta Y = 0.3(\sin \theta - \sin(\theta+1))$$

The smallest change that needs to be detected along each vector component may be determined by taking the derivative of each component and determining were the derivative crosses the 0 axis.

$$dX/d\theta = -0.3 \sin \theta = 0 \text{ at } \theta = 0 \text{ degrees}$$

$$dY/d\theta = 0.3 \cos \theta = 0 \text{ at } \theta = 90 \text{ degrees}$$

The highest resolution in the x-component is needed when the angle rotates from 0 to 1 degree and corresponds to 45.7 μG. The same resolution is needed when the y-component rotates from 89 to 90 degrees.

Swing tempo may be determined by using vector component 606 (z axis) as a tilt sensor. A reference measurement of vector component 606 may be recorded before the back swing. The period required for the club head to return to a position such that the vector component 606 returns to the measured reference value corresponds to the swing tempo. In an alternative embodiment, velocity information may also be just to determine impact time and the resulting swing tempo.

Figure 7:
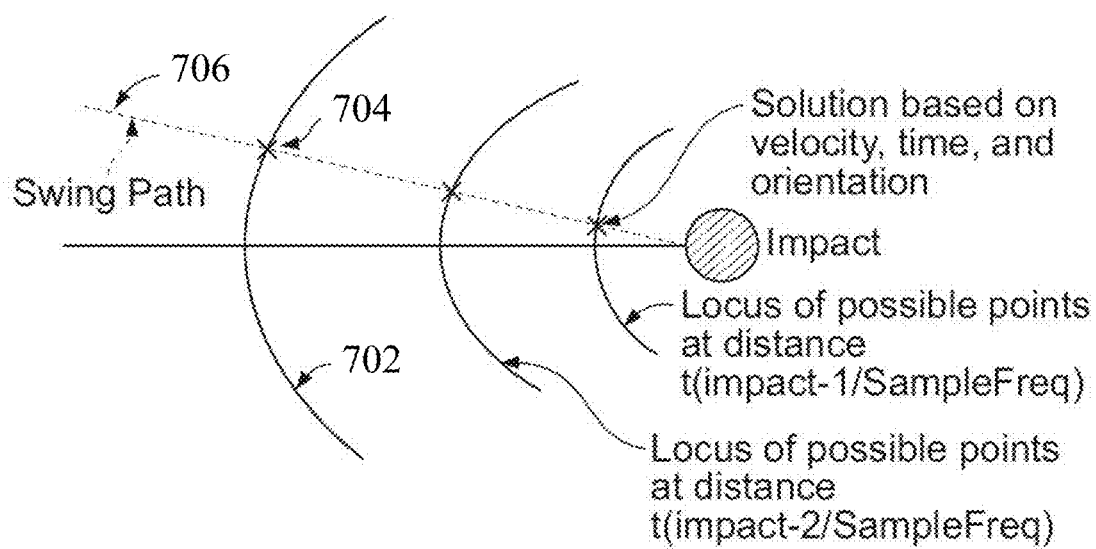
FIG. 7 schematically depicts a swing path determination process.

Several different measurements may be used to determine the swing path. FIG. 7 schematically depicts a swing path determination process. In one implementation, a swing path may be determined from velocity, time, and orientation measurements. For example, velocity and time information measurements may be used to determine a first locus of points 702. Next, an orientation measurement may then be used to determine a first location 704 along first locus of points 702. The process of identifying club locations may be repeated several times to determine a swing path 706. In one embodiment, measurements are taken at least 1 kHz during a swing. Swing path 706 may be determined relative to a reference orientation and impact location.

Figure 8:
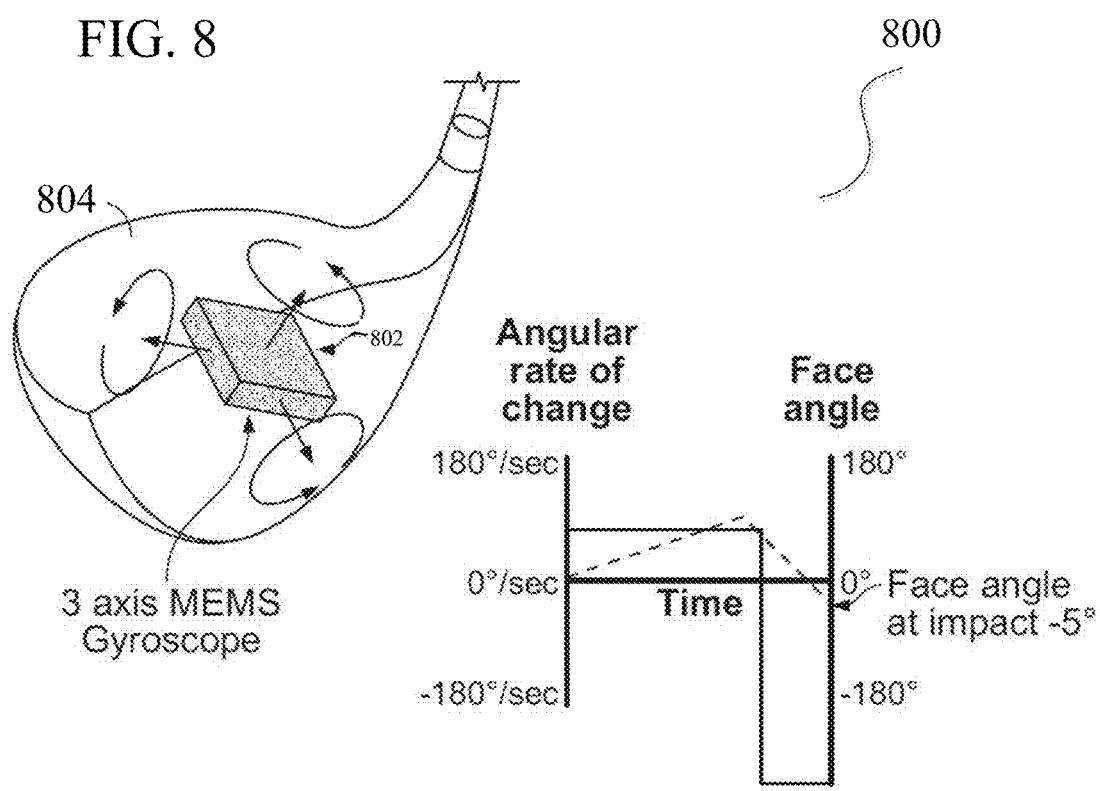
FIG. 8 depicts an implementation of an instrumented golf club with a golf club head configured with a gyroscope.

FIG. 8 illustrates yet another example golf club head 800, configured with a gyroscope. Golf club 102 from FIG. 1 may, in one implementation, comprise a golf club head similar to golf club head 800. Gyroscope 802 may, in another implementation, be positioned within golf club head 800 to measure one or more golf swing parameters. Gyroscope 802 may be implemented with a micro-electromechanical system (MEMS) or other device or module capable of fitting within golf club head 804. A three-axis gyroscope may be used to increase accuracy.

Gyroscope 802 may be used to determine golf swing parameters by assuming that the point of rotation is a golfer's shoulders. Club head velocity may be determined by an accelerometer that is part of the same MEMS, an external accelerometer or some other device. For golf swing parameter determination purposes, in the proximity of a ball the movement of golf club head 804 may be modeled as an object moving on the surface of a sphere. The sphere has a radius equal to the length of the club plus the length of the golfer's arms. In one embodiment, a standard radius of 62.5 inches is used. In other embodiments, a golfer may provide his or her arm length and/or club length for more accurate determinations.

Figure 9:
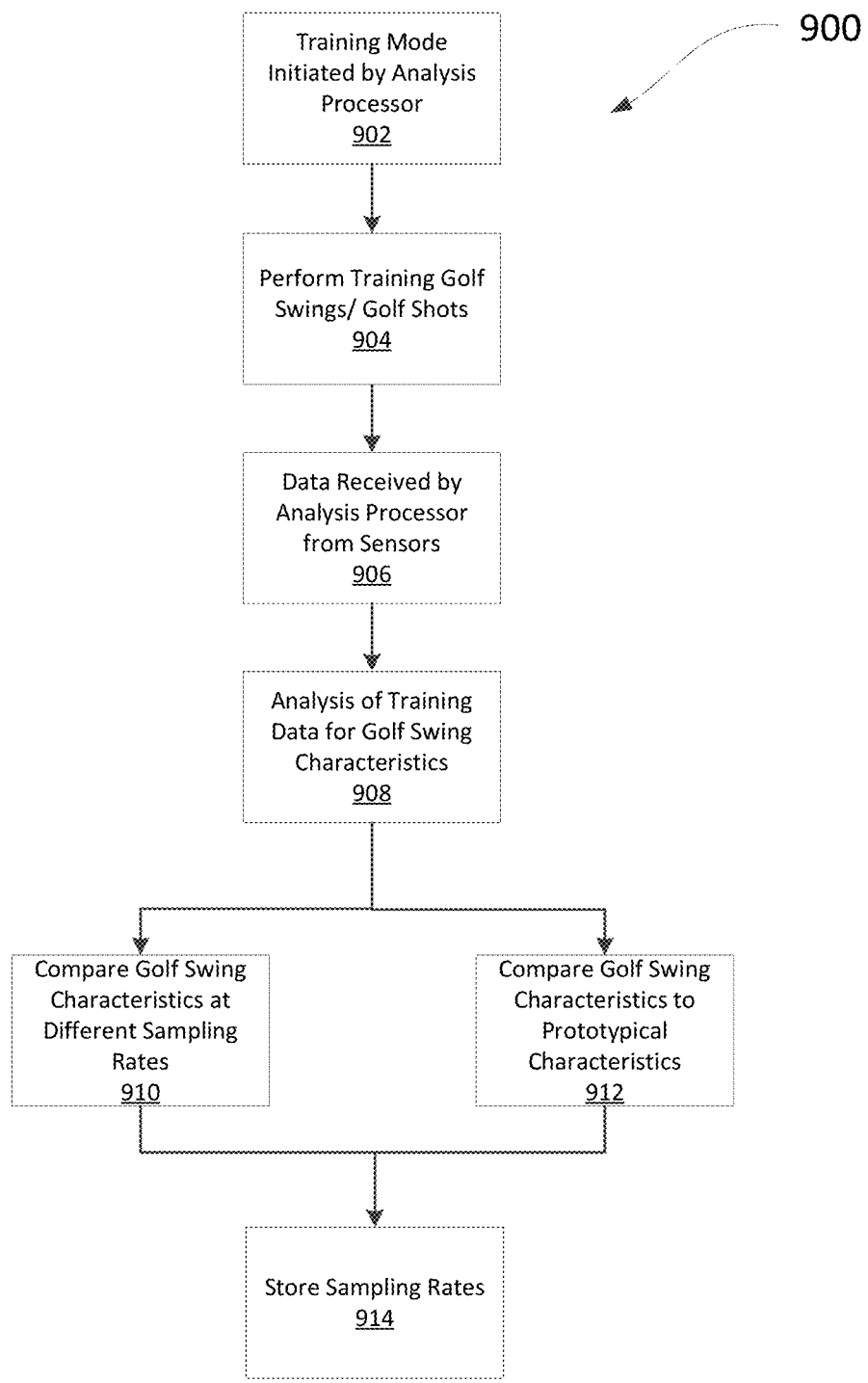
FIG. 9 is a flowchart diagram of a golf swing training process.

FIG. 9 is a flowchart diagram of example golf swing training process 900. The golf swing training process 900 is initiated by analysis processor 204 from FIG. 2 at block 902. In one implementation, analysis processor 204 may initialize the golf swing training process 900 in response to, among others, an input from a user (golf player), or upon first initialization of sensor device 120, or combinations thereof. During golf swing training process 900, analysis processor 204 executes one or more processes for gathering and characterizing golf swing data.

Analysis processor 204, at block 904 of process 900, receives data from one or more sensors during one or more "training" golf swings performed by a user. In one arrangement, analysis processor 204 communicates a request to a user to perform a number of golf swings of a specific type. For example, analysis processor 204 may communicate, using one or more of an audio, a visual, or a haptic cue, a request for a user to execute three successive "drive" shots. In other arrangements, analysis processor 204 may request that one or more training golf swings be performed by the user in a specific way. For example, in addition to performing three successive drives (drive shots), analysis processor 204 may request that the user execute each drive shot as a straight shot, draw shot, or fade shot, and the like. In other embodiments, and depending on the club-type being used by the player, analysis processor 204 may request one or more training golf swings be performed of other specific types. For example, when using "long iron" golf club, analysis processor 204 may request one or more of a straight shot, a draw shot, a fade shot, or a punch shot, and the like. In yet another example, when using a "wedge" golf club, the analysis processor 204 may request one or more of a straight shot, a draw shot, a fade shot, or a flop shot, and the like. In yet another embodiment, training golf swings may be performed by a user by swinging a golf club and making impact with a golf ball, or swing a golf club without making impact with a golf ball. As noted herein, training golf swings may be golf swings performed in a training mode as described, golf swings designated for storage in a sample population and/or swings captured during normal play. Accordingly, the system might not necessarily instruct the user to perform certain types of swings. In one example, the system may automatically determine the type of swing or ask the user to identify the type of swing post-swing.

During the one or more training golf swings performed by a user at block 904, one or more sensor values (data points) are inputted by sensor 202, wherein these one or more sensor values are representative of the one or more training golf swings performed. Analysis processor 204 receives the sensor data at block 906, wherein block 906 may include one or more processes to check that the received data from sensor 202 corresponds to one or more general golf swing types. In this way, block 906 may compare the received data to one or more generic golf swing data sets, and request that's the user repeats the training shots if the received data does not match the generic golf swing data sets to within a specific tolerance value. For example a generic golf swing data sets may include four distinct sensor data patterns, including a pause prior to commencement of the golf swing, one or more sensor values corresponding to a golf backswing, one or more sensor values corresponding to a golf downswing, one or more sensor values indicative of a moment of impact or a point in time immediately prior to the moment of impact, and one or more sensor values corresponding to a follow-through.

Analysis processor 204, at block 908, may execute one or more processes to extract one or more golf swing characteristics (patterns, threshold values, and/or trends) from the received sensor data representative of one or more training golf swings. This golf swing characterization may compare multiple training golf swings of a same type to one another, and identify one or more characteristics of the golf swings that are common to each. In this way, analysis processor 204 may store one or more characteristics of a specific golf swing type associated with a given user. These one or more golf swing characteristics may include, among others, a number of practice shots before hitting a golf ball, a backswing speed, a backswing time, a downswing speed, a downswing time, a follow-through distance, and a follow-through time, other characteristics described herein among others. These characteristics may then be used to define triggering conditions for dynamically modifying the sampling rate before, during and/or after a swing or portions of a swing.

In one example, sampling rate processor 206 instructs analysis processor 204 to sample the training golf swings associated with blocks 904, 906, and 908, at an upper, or highest sampling rate. Subsequently, analysis processor 204, at block 910, may compare one or more identified swing characteristics, found using data sampled at a highest sampling rate, to data sampled at one or more lower sampling rates. If a swing characteristic identified from data sampled at an upper sampling rate is still present in data sampled at a lower sampling rate, analysis processor may save, at block 914, the lower sampling rate in association with the identified swing characteristic.

In another example, and at block 912, analysis processor 204 compares one or more identified golf swing characteristics to prototypical golf swing characteristics (prototypical golf swing samples). Prototypical golf swing characteristics may be stored as a data set in memory 210, wherein such a data sets may associate a prototypical golf swing characteristic with a sampling rate. In response analysis processor 204 may store, at block 914, an identified swing characteristic in association with a sampling rate found from the prototypical golf swing characteristic data set.

Figure 10:
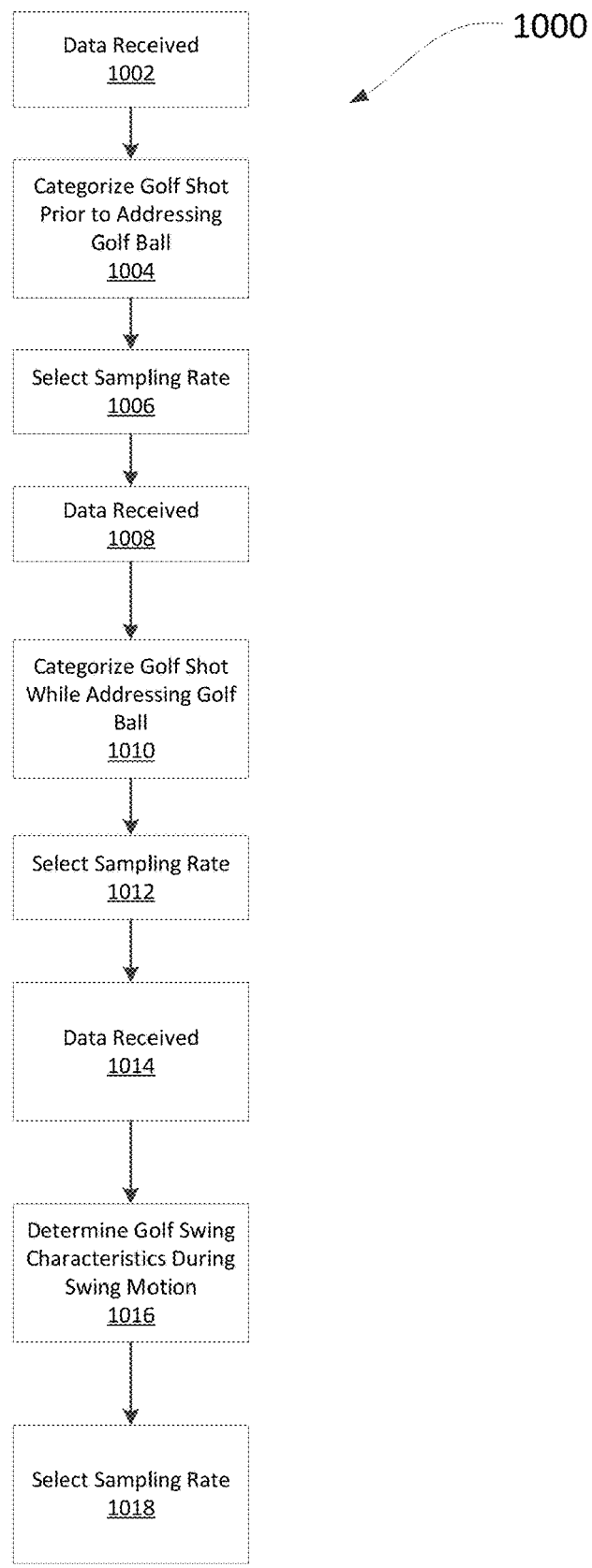
FIG. 10 is a flowchart diagram of a sample rate selection process.

FIG. 10 is a flowchart diagram of a sample rate selection process 1000, executed by sampling rate processor 206 from FIG. 2. In one example, process 1000 is initialized at block 1002 by the receipt of data. Data may be received from, among others, sensor 202, or an outside source, such as weather data or golf course information data from the Internet. In another example, sensor device 120 may be in a sleep mode, or hibernation state until data is received at block 1002. In yet another example, analysis processor 204 is in a sleep mode while sampling rate processor 206 executes one or more processes waiting for receipt of new data block 1002. Upon receipt of data at block 1002, sampling rate processor 206 may execute one or more processes to "wake" analysis processor 204. In another embodiment, analysis processor 204 may be in a sleep mode until sensor 202 outputs a signal representative of a golf club being removed from a bag, or swung in a manner representative of a practice golf swing, and indicative of a user preparing to use the golf club to take a golf shot. In this way, and while in a sleep or hibernation state, analysis processor 204 uses a low amount of electrical energy, and the overall power consumption by sensor device 120 may be reduced by a comparatively significant amount.

Block 1004 represents one or more processes, executed by analysis processor 204, to characterize a golf shot from the data received at block 1002. In particular, block 1004 characterizes golf shot data prior to a player addressing a golf ball, wherein addressing a golf ball refers to positioning a golf club in close proximity to the golf ball just prior to commencing a golf shot. In this way, the data received at block 1002 may be representative of, among others, a specific golf club being selected out of a golf bag, or one or more practice swings, or combinations thereof. At step 1004, analysis processor may execute one or more processes to identify one or more golf shot categories including, among others, a golf club type, prevailing weather conditions (received, for example, by sensor device 120 through network 110), distance to pin (golf flagstick, or target position) information (received, for example, by sensor device through network 110 in combination with a GPS sensor 202), wind speed information (received from one or more of a wind speed sensor 202, or network 110, among others), golf course condition information (received, for example, through network 110, and including, among others, general golf course condition information including green speed information, and fairway water content information e.g. are "pick, clean, and place" rules in effect, and the like), and player handicap information, or combinations thereof, and the like. Upon identification of one or more golf shot categories, sampling rate processor 206 may identify one or more sampling rates corresponding to the identified categories, and instruct analysis processor 204 to sample data from sensor 202 using these newly-identified sampling rates.

Analysis processor 204 receives further data, from one or more of sensor 202 or network 110, at block 1008, wherein analysis processor 204 samples data from sensor 202 at one or more sampling rates identified at block 1006. Asked block 1010, analysis processor 204 may identify one or more golf shot categories while addressing a golf ball. The one or more identified golf shot categories may include, among others, a lie type, or a golf shot type (identified based on the angle of a club face during address of the golf ball), and the like. In a similar manner to block 1006, sampling rate processor 206 selects one or more sampling rates at block 1012 corresponding to the one or more categories of golf shot identified at block 1010. In response, sampling rate processor 206 instructs analysis processor 204 to receive data from, among others, sensor 202 at the newly-identified sampling rates from block 1012, wherein the one or more sampling rates are stored in memory 210 in association with the one or more golf shots categories.

Analysis processor 204 receives further data at block 1014, wherein this received data is sampled at one or more sampling rates identified by sampling rate processor 206 at block 1012. At block 1016, one or more golf swing characteristics are identified from the received data, wherein the golf swing characteristics represent real-time golf swing motion. These golf swing characteristics may include, among others, a back swing speed, a back swing time, a den swing speed, a downswing time, a follow-through distance, any follow-through time, among others. Sampling rate processor 206 may compare one or more of these identified golf swing characteristics to one or more golf swing samples. In one implementation, the one or more golf swing samples may have been saved in combination with one or more sampling rates during a training mode, wherein the training mode is executed by analysis processor 204. In response, sampling rate processor 206 selects, at block 1018, one or more sampling rates corresponding to the one or more identified golf swing characteristics. In response, sampling rate processor 206 executes one or more processes to instruct analysis processor 204 to sample future incoming data received from, among others, sensor 202, at the newly-selected sampling rates.

In this way, sample rate selection process 1000 may dynamically adjust a sampling rate of analysis processor 204 such that data from sensor 202 is sampled at a rate sufficient for capturing data representative of the golf swing, or part thereof. Furthermore, sampling rate processor 206 may adjust the sampling rate used by analysis processor 204 multiple times before, during, and after golf swing, among others e.g. blocks 1006, 1012, and 1018. Additionally, the adjustment of a sampling rate, by sampling rate processor 206 may achieve an overall reduction in power consumption from power supply 208, by sensor device 120.

The present disclosure is described above and in the accompanying drawings with reference to a variety of example structures, features, elements, and combinations of structures, features, and elements. The purpose served by the disclosure, however, is to provide examples of the various features and concepts related to the disclosure, not to limit the scope of the disclosure. One skilled in the relevant art will recognize that numerous variations and modifications may be made to the embodiments described above without departing from the scope of the present disclosure, as defined by the appended claims. For example, aspects described herein may be applied to a variety of sports and sporting equipment. In one or more arrangements, devices and processes having dynamic sampling rate properties described herein may be used to determine sports actions performed with a baseball bat, lacrosse stick, hockey stick, boxing gloves and the like. In one example, a sampling rate may be increased (or decreased) for a hockey stick based sensor upon determining that a player is about to take a shot. Whether the player is about to take a shot may be determined in a variety of ways including detecting acceleration in a forward direction by a sensor disposed in the hockey stick. In another example, a sampling rate may be increased (or decreased) when a player is beginning to take a swing with a baseball bat to his an incoming baseball or immediately prior to a moment of impact with a baseball.

We claim:

1. An item of sports equipment, comprising:
   a processor;
   a sensor configured to capture sensor data related to at least one metric of a swing;
   a transceiver configured to receive transceiver data related to a location of a ball, and prevailing conditions; and
   a non-transitory computer-readable medium comprising computer-executable instructions that when executed by the processor is configured to cause the item of sports equipment to perform:
      receiving the sensor data from the sensor;
      sampling the received sensor data at a first sampling rate;
      receiving the transceiver data from the transceiver;
      identifying, from the sensor data, an orientation of the item of sports equipment indicating a shot type;
      classifying the sensor and transceiver data into one of a plurality of swing categories, based upon the identified orientation of the item of sports equipment indicating a shot type; and
      based upon at least the classified swing category, selecting a second sampling rate, by a sampling rate processor, for sampling sensor data from the sensor.

2. The item of sports equipment of claim 1, wherein the non-transitory computer-readable medium further comprises instructions that when executed further cause the item of sports equipment to perform:
   comparing a first value of the sensor data obtained from the sensor during operation of the processor at a first sampling rate to a plurality of threshold values;
   determining that the first value of the sensor data corresponds to a first threshold value within the plurality of threshold values; and wherein the selection of the second sampling rate is based upon both the correspondence of the first value of the sensor data to the first threshold value and the classified swing category.

3. The item of sports equipment of claim 1, wherein the item of sports equipment is a baseball bat, a lacrosse stick, or a hockey stick.

4. The item of sports equipment of claim 1, wherein the transceiver and sensor data is classified into a swing category based on a selected type of item of sports equipment.

5. The item of sports equipment of claim 1, wherein the transceiver data includes location information, and is classified into a swing category based on a distance to a target.

6. The item of sports equipment of claim 1, wherein the sensor and transceiver data is classified into the one of the plurality of swing categories based on a wind speed and a wind direction.

7. The item of sports equipment of claim 1, wherein the sensor is selected from a group comprising at least one of: an accelerometer, a force sensor, a gyroscope, a magnetic field sensor, an electromagnetic sensor, a microphone, a GPS sensor, a wind speed and direction sensor, and a resistivity sensor.

8. The item of sports equipment of claim 1, wherein the at least one metric of the swing includes a swing speed, or a swing acceleration.

9. The item of sports equipment of claim 1, wherein the first sampling rate is a default sampling rate.

10. The item of sports equipment of claim 1, wherein the first sampling rate is a last-used sampling rate.

11. An item of sports equipment comprising:
a first sensor configured to capture data related to at least one metric of a swing;
a second sensor configured to capture data related to prevailing conditions;
a processor; and
a non-transitory machine readable medium comprising instructions that when executed by the processor cause the item of sports equipment to:
receive first data from the first sensor;
sample the received first data at a first sampling rate;
receive second data from the second sensor;
identify, from the sensor data, an orientation of the item of sports equipment indicating a shot type;
classify the first and second data into one of a plurality of swing categories, based upon the identified orientation of the item of sports equipment indicating a shot type; and
select, based on the classification of the first and second data into the one of a plurality of swing categories, a second sampling rate for sampling data from the first sensor.

12. The item of sports equipment of claim 11, wherein the second sampling rate is lower than the first sampling rate.

13. The item of sports equipment of claim 12, wherein the at least one metric of the swing is identifiable in data received at the second sampling rate from the first sensor.

14. The item of sports equipment of claim 11, wherein the at least one metric of the swing includes a swing speed, or a swing acceleration.

15. The item of sports equipment of claim 11, wherein the first sensor is an accelerometer, a force sensor, a gyroscope, a magnetic field sensor, an electromagnetic sensor, a microphone, a GPS sensor, a wind speed and direction sensor, or a resistivity sensor.

16. A self-contained instrumented item of sports equipment, comprising:
a shaft;
a first sensor, configured to capture swing data related to at least one metric of a swing;
a second sensor configured to capture condition data related to prevailing weather conditions;
a sampling rate processor; and
an analysis processor,
wherein the analysis processor is configured to identify, from the swing data, an orientation of the item of sports equipment indicating a shot type;
wherein the analysis processor is configured to classify the swing data and condition data into a swing category based upon the identified orientation of the item of sports equipment indicating a shot type,
wherein the sampling rate processor is configured to select a first sampling rate and a second sampling rate at which the first sensor captures swing data, based upon the swing category, and
wherein the analysis processor is configured to compare the swing data sampled at the first sampling rate and the second sampling rate.

17. The instrumented item of sports equipment of claim 16, wherein the swing category is classified based on a selected item of sports equipment, or a distance to target.

18. The instrumented item of sports equipment of claim 16, wherein the second sampling rate is less than the first sampling rate.

19. The instrumented item of sports equipment of claim 18, wherein the at least one metric of the swing is identifiable in the swing data received at the second sampling rate.

20. The instrumented item of sports equipment of claim 16, wherein the item of sports equipment is a baseball bat, a lacrosse stick, or a hockey stick.

* * * * *